United States Patent [19]

Entingh

[11] Patent Number: 4,604,194
[45] Date of Patent: Aug. 5, 1986

[54] WATER CONDITIONER VALVE AND SYSTEM

[76] Inventor: Melvin E. Entingh, 3249 Dryden Rd., Dayton, Ohio 45439

[21] Appl. No.: 678,601

[22] Filed: Dec. 4, 1984

[51] Int. Cl.⁴ .............................................. C02F 1/44
[52] U.S. Cl. ..................................... 210/98; 210/137; 210/257.2
[58] Field of Search ............... 210/741, 97, 98, 137, 210/257.2, 424, 433.2

[56] References Cited

U.S. PATENT DOCUMENTS

| | | | |
|---|---|---|---|
| 3,493,495 | 2/1970 | Mendelson | 210/321 |
| 3,493,496 | 2/1970 | Bray et al. | 210/116 |
| 3,568,843 | 3/1971 | Brown | 210/321 |
| 3,630,378 | 12/1971 | Bauman | 210/257.2 |
| 3,679,055 | 7/1970 | Clark et al. | 210/110 |
| 3,688,911 | 9/1972 | Baerg | 210/104 |
| 3,719,593 | 3/1973 | Astil | 210/321 |
| 3,726,793 | 4/1973 | Bray | 210/321 |
| 3,746,640 | 7/1973 | Bray | 210/321 |
| 3,794,172 | 2/1974 | Bray | 210/257.2 |
| 3,794,173 | 2/1974 | Bray | 210/257.2 |
| 3,831,757 | 8/1974 | Gossett | 210/143 |
| 3,887,463 | 6/1975 | Bray | 210/110 |
| 3,959,146 | 5/1976 | Bray | 210/257.2 |
| 4,021,343 | 5/1977 | Tyler | |
| 4,176,063 | 11/1979 | Tyler | 210/101 |
| 4,482,456 | 11/1984 | Grayson | 210/433.2 |

Primary Examiner—John Adee
Attorney, Agent, or Firm—Jacox & Meckstroth

[57] ABSTRACT

Water conditioner system control valve apparatus in which there is a water filter unit and a water storage tank. The control valve apparatus has a passage through which water flows to the water filter unit and a passage through which brine water flows from the water filter unit. The control valve apparatus also has a passage through which product water flows from the water filter unit. The control valve apparatus includes valve members for controlling flow of water through the passages thereof in response to pressure of water in the control valve apparatus.

5 Claims, 1 Drawing Figure

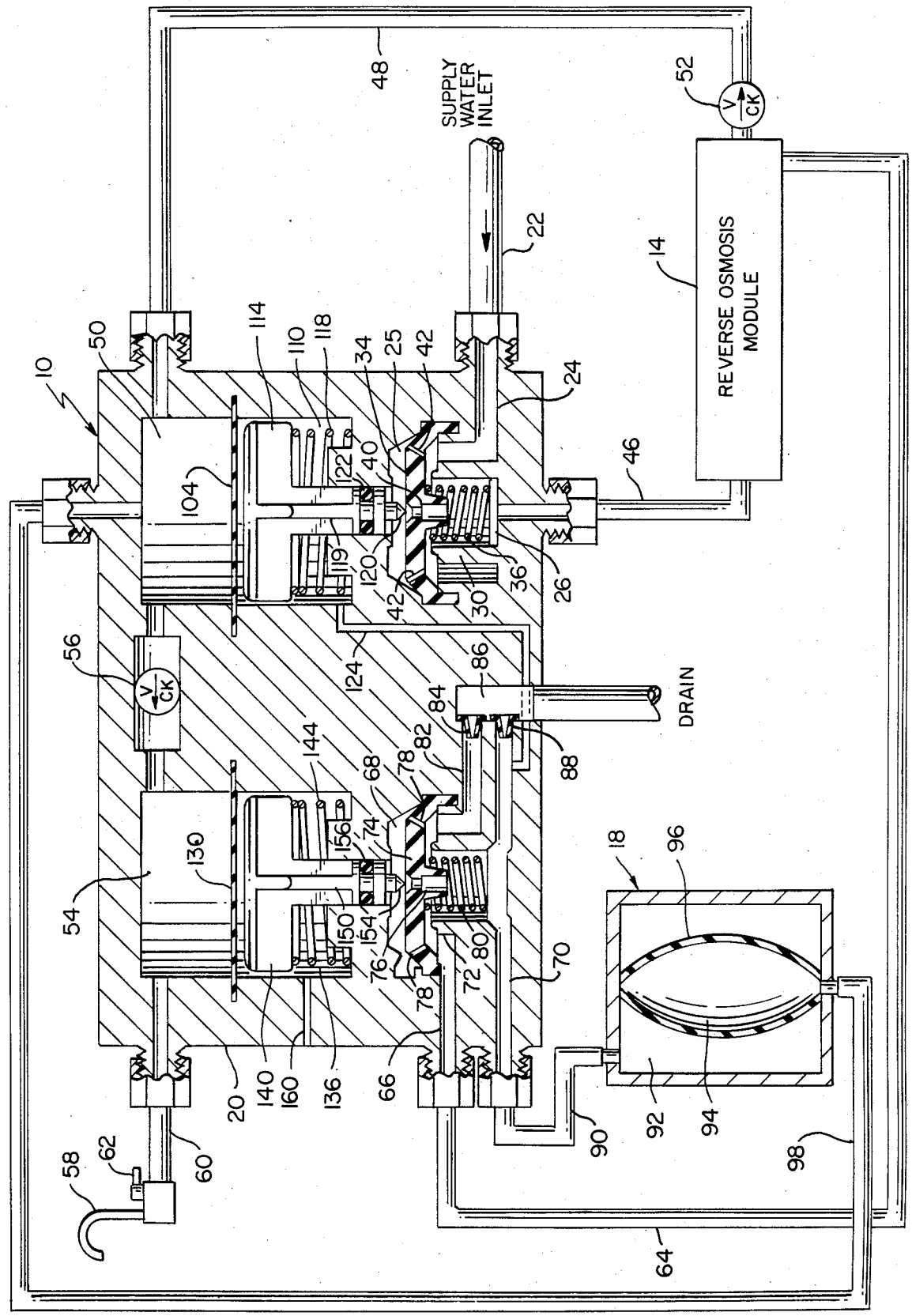

4,604,194

WATER CONDITIONER VALVE AND SYSTEM

BACKGROUND OF THE INVENTION

Water conditioner systems have been devised by which solids and organic materials are removed from water to provide water for drinking and cooking purposes and the like.

Known water conditioner systems have disadvantages. Some known water conditioner systems create a constant pressure upon portions of the system. Other systems permit constant flow of waste water. Other known systems unnecessarily restrict production of product water.

In some known water conditioner systems, the pressure changes within the water storage vessel result in significant changes in the rate of production of the product water. In the past, efforts to overcome this problem have not been completely successful because valving problems have not been solved.

It is an object of this invention to provide a water conditioner valve and system by which high quality product quality is obtained.

It is another object of this invention to provide such a water conditioner valve and system by which there is no pressure or limited water pressure in the system when stable conditions exist in the system.

It is another object of this invention to provide such a valve and system by which pressure changes within the water storage vessel do not affect the rate of production of the product water.

It is another object of this invention to provide such a valve and system in which a high volume of product water can be produced in a given period of time in consideration of the physical size of the system.

It is another object of this invention to provide such a valve and system which can be constructed and installed at relatiavely low costs and which is long lived.

Other objects and advantages of this invention reside in the construction of parts, the combination thereof, the method of production and the mode of operation, as will become more apparent from the following description.

SUMMARY OF THE INVENTION

A water conditioner valve and system of this invention comprises a reverse osmosis filter unit, a product water storage tank, and water flow control valve means. The product water storage tank has therewithin a flexible or movable wall which contains product water which flows from the reverse osmosis filter unit. Waste water or brine water from the reverse osmosis filter unit flows into the product water storage tank and is available to apply pressure to the flexible or movable wall within the storage tank to force product water from the tank to a receiver of the product water. The water flow control valve means controls flow of water from a source of supply water, and also controls flow of water to and from the reverse osmosis filter unit, and to and from the product water storage tank.

BRIEF DESCRIPTION OF THE FIGURE OF THE DRAWINGS

The FIGURE of the drawings is a sectional and diagrammatic view of a water conditioner valve and system of this invention.

DETAILED DESCRIPTION OF THE INVENTION

The FIGURE in the drawing illustrates valve structure 10 of this invention in association with a reverse osmosis module or unit 14 and a water storage tank 18. The valve structure 10 includes a valve housing 20.

A supply water inlet conduit 22 is joined to a passage 24 within the valve housing 20. The conduit 22 is connected to a source of untreated water. A cavity 25 joins the passage 24 to a passage 26 within the valve housing 20. A cylindrical wall 30 forms a portion of the passage 26. Within the cavity 25 and adjacent cylindrical wall 30 is a diaphragm valve 34 which is urged in a direction from the wall 30 by a spring 36. The diaphragm valve 34 has a main orifice 40 therethrough and a plurality of smaller auxiliary orifices 42 therethrough.

A conduit 46 connects the passage 26 of the housing 20 to the reverse osmosis module 14. A conduit 48 is connected to the reverse osmosis module 14 and to a passage 50 within the valve housing 20. Within the conduit 48 is a check valve 52. The passage 50 within the housing 20 is joined to a passage 54 through a check valve 56. The passage 54 is connected to a faucet 58 through a conduit 60. The faucet 58 is shown as having a control handle 62.

A conduit 64 connects the reverse osmosis module 14 to a passage 66 within the housing 20. A cavity 68 joins the passage 66 to a passage 70. A cylindrical wall 72 forms a portion of the passage 70. Within the cavity 68 and adjacent the cylindrical wall 72 is a diaphragm valve 74. The diaphragm valve 74 has a main orifice 76 therethrough and a plurality of auxiliary orifices 78 therethrough. A spring 80 urges the diaphragm valve 74 away from the cylindrical wall 72. The cavity 68 also joins the passage 66 to a passage 82. A flow restrictor 84 separates the passage 82 from a drain passage 86. A flow restrictor 88 separates the passage 70 from the drain passage 86. Preferably, the flow restrictors 84 and 88 are of the "duck-bill" type, so that the flow rate of water therethrough is related to the pressure of the water. However, any flow restrictor element which controls flow rate in accordance with water pressure may be satisfactory.

A conduit 90 joins the passage 70 to a compartment 92 within the storage tank 18. Also within the storage tank 18 and forming a compartment 94 is a flexible container or wall 96. A conduit 98 joins the flexible container 96 to the passage 50 which is within the housing 20.

Within the valve housing 20 is a flexible wall 104 which separates the passage 50 from a chamber 110. Within the chamber 110 is a piston 114 which is urged toward the flexible wall 104 by a spring 118. Attached to the piston 114 is a stem 119 which has a tapered end portion 120. Adjacent the tapered end position 120, the stem 119 is encompassed by a sealing ring 122. A passage 124 joins the chamber 110 to the passage 70 within the valve housing 20.

A flexible wall 130 within the valve housing 20 separates the passage 54 from a chamber 136. Within the chamber is a piston 140 which is urged toward the flexible wall 130 by a spring 144. Attached to the piston 140 is a stem 150 which has a tapered end portion 154. Adjacent the tapered end portion 154, the stem 150 is encompassed by a sealing ring 156. A vent passage 160 to atmosphere extends from the chamber 136 to the exterior of the valve housing 20.

OPERATION

Water from a water supply system flows into the housing 20 through the conduit 22 and enters the passage 24. The spring 36 normally maintains the diaphragm valve 34 in spaced relationship from the cylindrical wall 30. Thus, the water flows from the passage 24 into the cavity 25. The water flows from the cavity 25 into the passage 26. The water then flows from the passage 26 into the conduit 46 and into the reverse osmosis module 14. Some of the water in the module 14 flows through a membrane (not shown) within the module 14 and flows from the module 14 as product water through the check valve 52 and through the conduit 48 and into the passage 50 within the valve housing 20. Some of the water flowing in the module 14 does not flow through the membrane within the module and serves to wash the membrane. This washing water or brine water flows from the module 14 and into the conduit 64. The brine water flows through the conduit 64 into the passage 66 within the valve housing 20. The spring 80 normally maintains the diaphragm valve 74 spaced from the cylindrical wall 72. Therefore, the brine water flows from the passage 66 into the cavity 68 and into the passage 70. The brine water then flows from the passage 70 into the conduit 90 and through the conduit 90 into the water storage tank 18. The brine water flows into the water storage tank 18 exterior of the flexible container 96 and collapses the flexible container 96.

While brine water flows from the reverse osmosis module 14, product water flows from the module 14, through the check valve 52, through the conduit 48 and into the passage 50 in the valve housing 20. Product water flows from the passage 50, through the check valve 56, into the passage 54, and through the passage 54 into the conduit 60 and to the faucet 58. Due to the fact that the faucet is closed, product water does not flow therefrom. While product water flows through the passage 50, some of the product water also flows from the passage 50 into the conduit 98 and through the conduit 98 to the water storage tank 18 and into the flexible container 96 within the storage tank 18.

As product water accumulates within the passages 50 and 54 of the valve housing 20 and within the conduits 60 and 98 and as product water begins to enter the flexible container 96, the pressure of the product water within the passage 54 within the valve housing 20 forces the flexible wall 130 downward. Downward movement of the flexible wall 130 forces the piston 140 downwardly, against the forces of the spring 144. Downward movement of the piston 140 causes downward movement of the stem 150, and the tapered end portion 154 of the stem 150 serves as a valve element and enters the main orifice 76 in the diaphragm valve 74 and closes the main orifice 76 in the diaphragm valve 74. However, brine water which flows in the passage 66 flows through the auxiliary orifices 78 in the diaphragm valve 74. The brine water flows through the auxiliary orifices 78 in the diaphragm valve 74 to the upper surface of the diaphragm valve 74 and forces the diaphragm valve 74 into engagement with the cylindrical wall 72. Thus, the flow of brine water from the passage 66 is stopped. The pressure of brine water in the storage tank 18 and in the conduit 90 and in the passage 70 is thus released as brine water flows to the drain passage through the flow restrictor 88. The pressure of product water within the passage 54 is trapped and held by the check valve 56.

Thus, the flexible wall 130 is maintained in a downward condition, and the piston 140 is maintained in a downward position.

Thus, the pressure of brine water in the storage tank 18 exterior of the flexible container 96 is released. Supply water continues to enter the passage 24 through the conduit 22. The supply water continues to flow to the reverse osmosis module 14 thru the conduit 46. Thus, product water continues to be produced within the module 14, and product water continues to flow from the module 14 through the check valve 52 and through the conduit 48, and into the passage 50. The product water thus continues to flow outwardly from the valve housing 20 through the conduit 98 to the storage tank 18 and into the flexible container 96, increasing the volume of product water within the flexible container 96 and forcing the flexible container 96 to expand. Expansion of the flexible container 96 within the storage tank 18 forces brine water outwardly from the storage tank 18 through the conduit 90. The brine water flows through the conduit 90 into the passage 70 and from the passage 70 through the flow restrictor 88 into the drain passage 86.

During this time, as more product water is being produced within the module 14, brine water continues to flow from the module 14 through the conduit 64. Brine water flows through the conduit 64 into the passage 66, through the cavity 68, through the passage 82, through the flow restrictor 84 and into the drain passage 86.

As stated above, pressure of product water within the passage 54 results in movement of the flexible wall 130 and the piston 140 and the stem 150, closing the main orifice 76 and causing the diaphragm valve 74 to engage the cylindrical wall 72 to prevent flow of brine water to the storage tank 18. Thus the pressure of brine water in the tank 18 is released.

However, even though the pressure of product water within the passage 54 forces movement of the piston 140 and closing action of the diaphragm valve 74, the pressure of the product water within the passage 50 is not sufficient to force the flexible wall 104 downwardly. This is due to the fact that brine water pressure exists within the chamber 110, through the passages 124 and 70.

The pressure of the product water increases within the passage 50 as the flexible container 96 within the storage tank 18 fills to capacity. When capacity conditions occur, the pressure of product water within the passage 50 is sufficient to overcome pressure of brine water on the lower side of the flexible wall 104. This is due to the fact that the pressure within the passage was significantly reduced when the diaphragm valve 74 closed, but brine water continued to flow outwardly to the drain passage 86 through the flow restrictor 88. Then the flexible wall 104 moves downwardly and moves the piston 114 downwardly. Downward movement of the piston 114 moves the stem 119 downwardly, and the tapered end 120 of the stem 119 serves as a valve element and moves into the main orifice 40 in the diaphragm valve 34. Thus, water flows through the auxiliary orifices 42 in the diaphragm valve 34 to the upper surface of the diaphragm valve 34 causing the diaphragm valve 34 to move downward and engage the cylindrical wall 30.

Thus, flow of supply water from the passage 24 to the passage 26 is stopped. Thus, no additional supply water flows from the inlet conduit 22 into the valve housing 20. Thus, the entire system shown in the drawing is in a static stable condition. The flexible container 96 within tank 18 is filled with product water and the passages 50 and 54 within the valve housing are filled with product water, and the conduit 60 to the faucet 58 is filled with product water, all under product water pressure sufficient to maintain the flexible walls 130 and 104 in a depressed or downward condition.

When it is desired to obtain product water from the faucet 58, the handle 62 is operated to open communication between the conduit 60 and the faucet 58. Product water then flows from the conduit 60 into the faucet 58 and from the faucet 58. The product water is forced through the conduit 60 by product water within the passages 54 and 50 and by product water in the conduit 98, as product water flows from the flexible container 96 within the storage tank 18. Product water is forced from the flexible container and from the storage tank 18 through the conduit 98 when the faucet 58 is opened.

This pressure operation occurs as follows: When the faucet 58 is opened, product water flows from the conduit 60 and from the passages 54 and 50. When product water flows from the passages 54 and 50, product water pressure within the passages 54 and 50 is significantly reduced. Therefore, the pressure applied to the flexible walls 130 and 104 is significantly reduced. Therefore, the flexible walls 130 and 104 are permitted to move upwardly. Upward movement of the flexible walls 130 and 104 permits upward movement of the pistons 140 and 114, as these pistons 140 and 114 are moved upwardly by the springs 144 and 118 respectively. Thus, the stems 150 and 119 are moved upwardly, and the tapered end portion 154 is removed from the main orifice 76 in the diaphragm valve 74, and the tapered end portion 120 is removed from the main orifice 40 in the diaphragm valve 34. Thus, the brine water pressure on the upper surface of the diaphram valve 74 is removed, and the spring 80 moves the diaphragm valve 74 away from the cylindrical wall 72. Likewise, the main orifice 40 in the diaphragm valve 34 is opened and the pressure of supply water upon the upper surface of the diaphragm valve 34 is reduced. Then the spring 36 moves the diaphragm valve 34 away from the cylindrical wall 30. Thus, supply water flows from the passage 24 into the passage 26, through the conduit 46 and into the reverse osmosis module 14.

Thus, product water again flows from the module 14 through the conduit 48 and into the passage 50 in the valve housing 20. Brine water flows from the module 14 through the conduit 64, into the passage 66 within the valve housing 20. The brine water then flows from the passage 66, through the passage 70, through the conduit 90 and into the storage tank 18, exterior of the flexible container 96. The pressure of the brine water upon the exterior of the flexible container 96 forces product water from the flexible container 96, through the conduit 98 and into the passage 50. Thus, product water flows through the passages 50 and 54 and through the conduit 60 to the faucet 58. Thus, it is understood that product water is squeezed from the flexible container 96 by the brine water within the storage tank 18 when the faucet 58 is opened. When the faucet 58 is closed, the system functions in the manner discussed above.

Thus, it is understood that the valve and system of this invention is one in which brine water flow and supply water flow ceases when product water fills the system. Also, after the system is filled with product water no significant pressure exists in the system until the faucet 58 is opened to obtain product water therefrom.

It is to be understood that the terms "down", "downward", "upwardly", "downwardly", and the like used herein are not terms of limitation. The housing 20 may be oriented in any desired manner, without affecting the operation of the elements and members involved.

Although the preferred embodiment of the water conditioner valve and system of this invention has been described, it will be understood that within the purview of this invention various changes may be made in the form, details, proportion and arrangement of parts, the combination thereof, and the mode of operation, which generally stated consist in a structure or method within the scope of the appended claims.

The invention having thus been described, the following is claimed.

1. A water conditioner system for producing product water from supply water received from a water supply source, comprising:

water filter means, the water filter means including means for receiving supply water and means for producing and discharging product water and for discharging brine water, the water filter means having a water supply inlet passage and a product water outlet passage and a brine water outlet passage, a water container, a movable wall within the water container and separating the water container into a first portion and a second portion, a product water outlet conduit, the product water outlet conduit being operable and closeable, the product water outlet conduit being normally closed, a valve housing, the valve housing being provided with a water supply inlet passage and a water supply outlet passage, there being a first cavity within the housing and joining the water supply inlet passage to the water supply outlet passage, a first valve within the first cavity and positioned to control flow of water between the water supply inlet passage and the water supply outlet passage, spring means urging the first valve to an open position, the first valve being provided with a main orifice therethrough and an auxiliary orifice therethrough, a first closure member, the first closure member being movable into the main orifice to close the main orifice of the first valve, the housing also being provided with a third passage and a fourth passage, there being a second cavity leading from the third passage to the fourth passage, a second valve within the second cavity and positioned to control water flow between the third passage and the fourth passage, spring means urging the second valve to an open position, the second valve being provided with a main orifice and an auxiliary orifice, the housing also being provided with a fifth passage and a sixth passage, a check-valve separating the fifth and sixth passages, means joining the sixth passage to the product water outlet conduit, first piston means, means responsive to product water pressure in the fifth passage for operation of the first piston means, means responsive to operation of the first piston means for operation of the first closure member, second piston means, means responsive to pressure of product water in the sixth passage for operation of the second piston means, means responsive to operation of the second piston for controlling operation of the second closure member, first conduit means, the first conduit means joining the water supply outlet passage of the housing to the water supply inlet passage of the water filter means, second conduit means, the second conduit means joining the product water outlet passage of the water filter means to the fifth passage of the housing, third conduit means, the third conduit means joining the brine water outlet passage of the water filter means to the third passage of the housing, fourth conduit means, the fourth conduit means joining the fifth passage of the housing to the second portion of the water container, fifth conduit means, the fifth conduit means joining the first portion of the water container to the fourth passage of the housing, wherein supply water flows into the water supply inlet passage of the housing and supply water flows through the first cavity into the supply water outlet passage and from the supply water outlet passage through the first conduit means to the water filter means, product water flowing from the product water outlet passage of the water filter means through the second conduit means to the fifth passage of the housing, product water flowing from the fifth passage into the fourth conduit means and into the second portion of the water container, product water also flowing from the fifth passage into the sixth passage and into the product water outlet conduit, the product water when sufficient in volume and pressure operating the second piston and moving the second closure member into the main orifice of the second valve to close the main orifice of the second valve, wherein water flow through the auxiliary orifice within the second cavity forces the second valve to close communication between the third passage of the housing and the fourth passage of the housing, thus preventing flow of brine water to the water container, increased pressure of the product water in the fifth passage operating the first piston and moving the first closure member into the main orifice of the first valve to close the main orifice of the first valve member, wherein water flow through the auxiliary orifice in the first valve within the first cavity forces the first valve to close communication between the first passage and the second passage, thus preventing water flow from the water supply source to the water filter means, opening of the product water outlet conduit permitting flow of product water from the water container and from the fifth and sixth passages and reducing the pressure of product water within the fifth and sixth passages, wherein the first and second pistons operate and move the first and second closure members from the first and second valves, permitting the first and second valves to move to open position and permit flow of supply water through the water supply inlet passage and through the supply water outlet passage and into the water filter means, for additional flow of brine water from the water filter means and into the first portion of the water container thus applying pressure upon the movable wall within the water container and forcing product water to flow from the water container and through the fifth and sixth passages and into the product water outlet conduit.

2. The water conditioner system of claim 1 in which the housing is provided with a drain passage which is in communication with the fourth passage, and including water flow control means positioned to control water flow from the fourth passage to the drain passage.

3. In a water conditioner system provided with water storage means and water filter means, the water filter means having a supply water inlet passage and a product water outlet passage and a brine water outlet passage, the water storage means having a brine water portion and a product water portion, comprising:

water control housing means provided with a supply water passage and a brine water passage and a product water passage, means joining the supply water passage of the water control housing means to a source of supply water, means joining the supply water passage of the water control housing means to the supply water inlet passage of the water filter means, means joining the brine water passage of the water control housing means to the brine water portion of the water storage means and to the brine water outlet passage of the water filter means, means joining the product water passage of the water control housing means to the product water outlet passage of the water filter means and to the product water portion of the water storage means, first valve means within the water control housing means and responsive to pressure of product water within the product water passage, the first valve means being positioned to control flow of supply water through the supply water passage, and second valve means within the water control housing means and responsive to pressure of product water within the product water passage, the second valve means being positioned to control flow of brine water through the brine water passage of the water control housing means, the first valve means including a first movable valve member provided with a main orifice and an auxiliary orifice, the second valve means including a second movable valve member provided with a main orifice and an auxiliary orifice, the first valve means also including first closure means operable to close the main orifice of the first valve member while water flowing through the auxiliary orifice of the first valve member produces pressure upon the first valve member to move the first valve member to closed position to close the product water passage, the second valve means including second closure means operable to close the main passage of the second valve member while water flowing through the auxiliary orifice of the second valve member produces pressure upon the second valve member to move the second valve member to closed position to close the brine water passage.

4. In a water conditioner system provided with water storage means and water filter means, the water filter means having a supply water inlet passage and a product water outlet passage and a brine water outlet passage, the water storage means having a brine water portion and a product water portion, comprising:

water control housing means provided with a supply water passage and a brine water passage and a product water passage, means joining the supply water passage of the water control housing means to a source of supply water, means joining the supply water passage of the water control housing means to the supply water inlet passage of the water filter means, means joining the brine water passage of the water control housing means to the brine water portion of the water storage means and to the brine water outlet passage of the water filter means, means joining the product water passage of the water control housing means to the product water outlet passage of the water filter means and to the product water portion of the water storage means, first valve means within the water control housing means and responsive to pressure of product water within the product water passage, the first valve means being positioned to control flow of supply water through the supply water passage, and second valve means within the water control housing means and responsive to pressure of product water within the product water passage, the second valve means being positioned to control flow of brine water through the brine water passage of the water control housing means, the water control housing means also being provided with a first cavity and a second cavity, a first piston within the first cavity and a second piston within the second cavity, movable wall means separating the product water passage from the first cavity and from the second cavity, the movable wall means being movable in response to pressure of product water within the product water passage, the movable wall means being movable to move the first piston and the second piston within the respective cavities thereof, the first valve means having a main orifice and an auxiliary orifice therethrough, the second valve means having a main orifice and an auxiliary orifice therethrough, the first piston including means movable within the supply water passage for closing the main orifice in the first valve means, the second piston including means movable within the brine water passage for closing the main orifice in the second valve means, wherein the first valve means has supply water pressure applied thereto through the auxiliary orifice thereof to force closing of the first valve means when the main orifice thereof is closed and wherein the second valve means has brine water pressure applied thereto through the auxiliary orifice thereof to force closing of the second valve means when the main orifice thereof is closed.

5. In a water conditioner system provided with water storage means and water filter means, the water filter means having a supply water inlet passage and a product water outlet passage and a brine water outlet passage, the water storage means having a brine water portion and a product water portion, comprising:

water control housing means provided with a supply water passage and a brine water passage and a product water passage, means joining the supply water passage of the water control housing means to a source of supply water, means joining the supply water passage of the water control housing means to the supply water inlet passage of the water filter means, means joining the brine water passage of the water control housing means to the brine water portion of the water storage means and to the brine water outlet passage of the water filter means, means joining the product water passage of the water control housing means to the product water outlet passage of the water filter means and to the product water portion of the water storage means, first valve means within the water control housing means and responsive to pressure of product water within the product water passage, the first valve means being positioned to control flow of supply water through the supply water passage, and second valve means within the water control housing means and responsive to pressure of product water within the product water passage, the second valve means being positioned to control flow of brine water through the brine water passage of the water control housing means, a first piston and a second piston, means responsive to pressure of product water within the product water passage for operation of the first piston and the second piston, the first valve means having a main orifice therethrough, the second valve means having a main orifice therethrough, the first piston including means for closing the main orifice in the first valve means, the second piston including means for closing the main orifice in the second valve means, the first valve means having an auxiliary orifice therethrough, wherein the first valve means has water pressure applied thereto through the auxiliary orifice and within the supply water passage to force closing of the first valve means when the main orifice in the first valve means is closed, the second valve means having an auxiliary orifice therethrough, wherein the second valve means has water pressure applied thereto through the auxiliary orifice and within the brine water passage to force closing of the second valve means when the main orifice in the second valve means is closed.

* * * * *